United States Patent [19]
Benway

[11] Patent Number: 5,913,804
[45] Date of Patent: Jun. 22, 1999

[54] MOWER DECK LID LOCKING MECHANISM

[75] Inventor: Randy Edward Benway, Horicon, Wis.

[73] Assignee: Deere & Company, Moline, Ill.

[21] Appl. No.: 08/867,364

[22] Filed: Jun. 2, 1997

[51] Int. Cl.[6] .................................................. A01D 67/00
[52] U.S. Cl. ..................... 56/320.2; 56/202; 56/DIG. 20
[58] Field of Search ............................... 56/320.2, 320.1, 56/199, 200, 202, 203, DIG. 20

[56] References Cited

U.S. PATENT DOCUMENTS

| | | |
|---|---|---|
| 3,118,267 | 1/1964 | Shaw . |
| 3,503,194 | 3/1970 | Ritums ....................................... 56/255 |
| 3,673,778 | 7/1972 | Ramey .................................... 56/320.2 |
| 3,797,214 | 3/1974 | Erdman et al. ......................... 56/320.2 |
| 3,805,499 | 4/1974 | Woelffer et al. .................... 56/320.2 X |
| 4,041,682 | 8/1977 | Kidd .................................... 56/320.2 X |
| 4,726,178 | 2/1988 | Mallaney et al. .......................... 56/202 |
| 4,882,898 | 11/1989 | Samejima et al. ......................... 56/208 |
| 5,195,311 | 3/1993 | Holland .................................. 56/320.2 |

FOREIGN PATENT DOCUMENTS 2331508 6/1973 Germany .

OTHER PUBLICATIONS

Photo of Murray Ultra 46" sub–chute with no spring or locking mechanism, on sale more than one year prior to filing the present invention. no date.

*Primary Examiner*—Heather Shackelford

[57] ABSTRACT

A locking mechanism for a lid which covers an opening in a mower deck directly above blades which rotate within the deck, the locking mechanism locks the lid in a position generally covering the opening and is releasable by an operator for allowing the operator to shift the lid to a position whereat the opening is generally uncovered. A chute extends laterally outwardly from the opening, is pivotable as the chute abuts obstructions during mowing operations. The locking mechanism remains locked as the chute pivots. The locking mechanism includes a rod member about which the lid is pivotable between open and closed positions. A torsion spring biases the lid to pivot to the closed position and biases the lid to shift laterally. A cam member fixed with the lid includes a finger portion which abuts a blocking member for blocking the cam member and lid from pivoting from the closed to the open position. The lid is shiftable by the operator for shifting the finger portion clear of the blocking member to allow the lid to be pivoted by the operator to its open position.

21 Claims, 4 Drawing Sheets

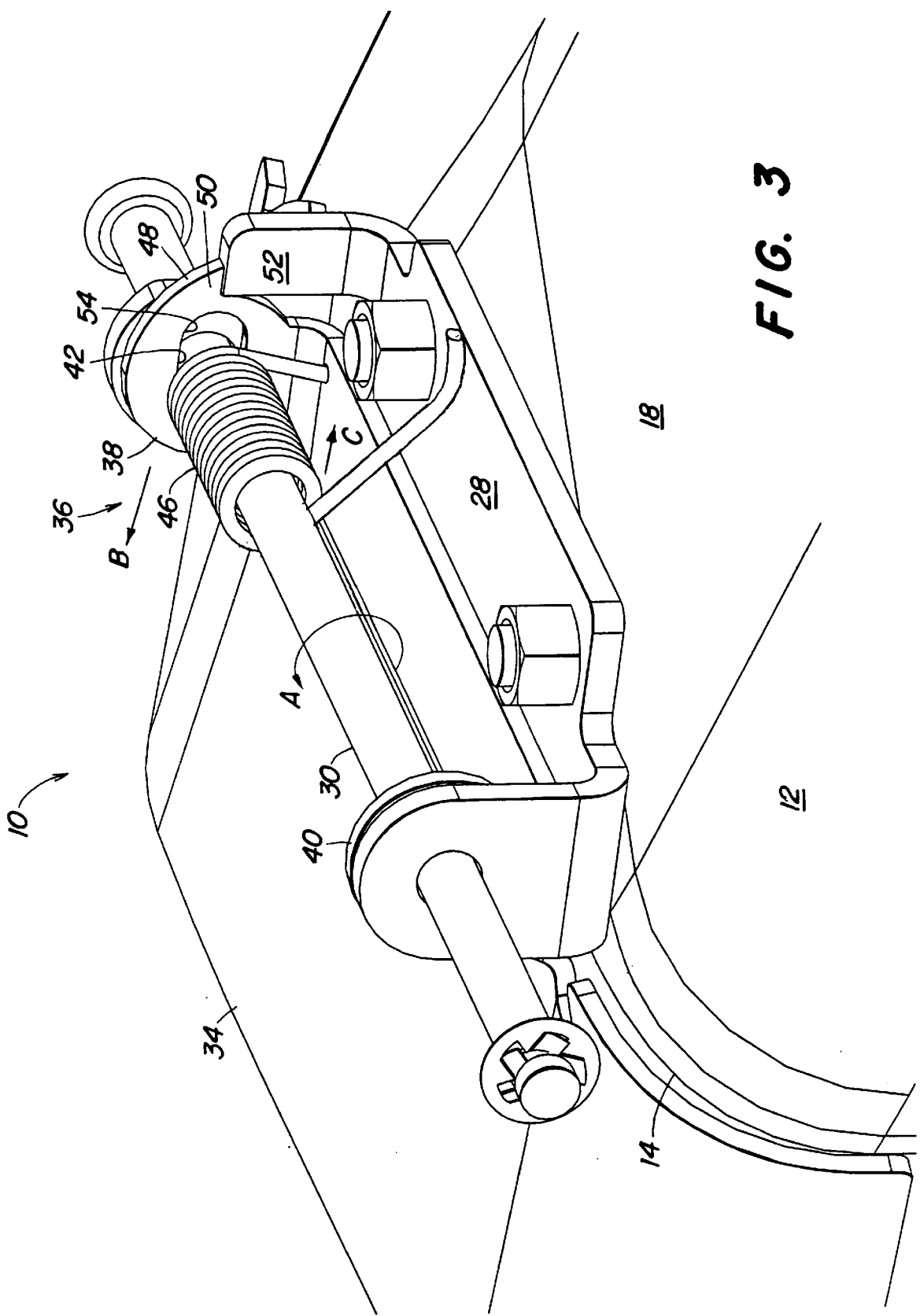

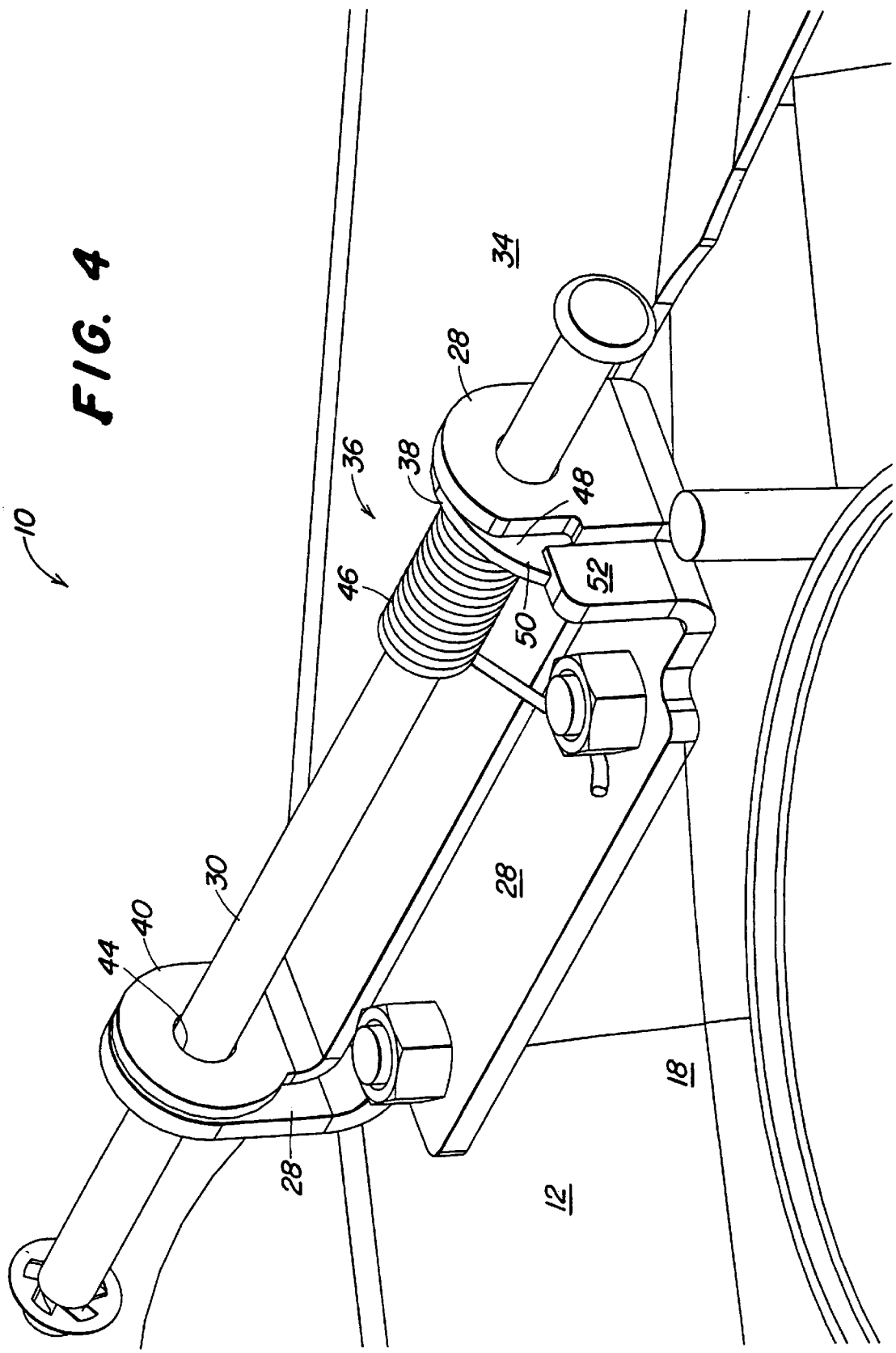

ness,804

MOWER DECK LID LOCKING MECHANISM

This invention relates to mechanisms that secure a lid over a discharge opening in a mower deck.

Conventional mowers include a mower deck or housing within which mower blades rotate for cutting vegetation and grass. The mower blades include leading cutting edges and also trailing upturned wing portions that the act to create an updraft within the mower deck that causes clippings to be propelled upwardly and radially outwardly from the blade. The mower deck generally confines these clippings and causes the clippings to circulate around the blades. Some mowers provide an opening in the side of the mower deck through which are thrown grass clippings that have been cut by the blades. The draft created by the rotating blades blows the clippings through the side opening. Side discharge mowers typically include a chute that extends laterally outwardly and downwardly from the side opening for directing clippings downwardly into the turf alongside the mower. These chutes are often coupled with the mower deck by a hinge mechanism that allows the chute to pivot upwardly when the chute abuts an obstruction such as when mowing close alongside buildings, fences or tree trunks. This pivoting of the chute helps prevent damage to the chute as well as the obstruction.

Another type of mower blows clippings from the mower deck into a bag or container carried by the mower vehicle. Some such bagging mowers include an opening in the top wall of the mower deck through which clippings are expelled. The clippings are discharged upwardly through the opening in the top wall of the mower deck by the updraft created by the wings on the mower blade. The clippings passing through the opening in the top wall of the mower deck have a relatively high velocity since the opening is positioned directly above the mower blade. However, the clippings must travel a relatively long distance through a conduit to a container carried at the rear of the vehicle. Some bagging mower provide a blower attachment mounted over the opening for receiving discharged clippings. The blower attachment includes a powered fan blade mechanism that helps blow the clippings through the conduit to a bag or other container carried at the rear of the vehicle.

Some of the bagging mowers described above are adapted to be converted between a bagging mode and a side discharge mode. To convert the mower from a bagging to a side discharge mode, the operator removes the conduit or blower attachment from the mower deck opening. A chute is typically provided which will then pivot downwardly to cover the opening in the top wall as the conduit or blower attachment is removed. The opening in the mower deck extends downwardly into the side wall of the mower deck. This side portion of the opening is generally closed by the presence of the conduit or blower attachment, but is open when the conduit or blower attachment is removed. The chute that pivots down after removal of the conduit or blower attachment extends laterally outwardly and downwardly from the side opening. The outer portion of the chute therefore acts to direct clippings that are discharged through the side opening downwardly into the turf alongside the mower deck. These chutes are typically biased to a downwardly position so they will pivot down to close the top opening when the conduit or blower attachment is removed. The biaser, which is typically a spring, also allows the chute to pivot upwardly when the chute strikes or abuts an obstruction during mowing operations. As the chute pivots upwardly when an obstruction is encountered the opening in the top wall of the deck is uncovered at least partially. This undesirably exposes the rotating blade, and allows clippings and other material to be directed with an upward trajectory out of the mower deck.

It would therefore be desirable to provide a mower deck that includes an opening in the top and side walls of the deck that is adapted to receive a conduit or blower attachment for mowing operation in a bagging mode. It would be desirable for such a deck to be convertible to a side discharge mode. It would be desirable to provide such a mower with a chute that directs clippings downwardly into the turf in the side discharge mode, and that can pivot when the chute abuts obstructions so that damage to the chute and the obstruction is minimized. It would be desirable for such a mower to allow the chute to pivot in this manner without also exposing the rotating blade.

SUMMARY OF THE INVENTION

The present invention provides a locking mechanism for a lid which covers an opening in a mower deck. The opening includes a top portion formed in the top wall of the mower deck directly above the path of the mower blade, and a side portion formed in the side wall of the mower deck. A conduit or blower attachment can be mounted to the deck to receive clippings through the top portion of the opening, and serves to direct the clippings to a bag or other container carried at the rear of the vehicle. With the conduit or blower attachment in place, the side portion of the opening is closed or covered by portions of the conduit or blower attachment. When the conduit or blower attachment is removed, a lid pivots downwardly to cover the top portion of the opening. The side portion of the opening is then open to allow clippings to be directed outwardly for operation in a side discharge mode. A side discharge chute is provided for directing side discharged clippings generally downwardly into the turf. The present invention includes a locking hinge mechanism that allows the discharge chute to pivot upwardly such as when the chute strikes obstructions during mowing operations. However, the locking mechanism secures the lid in its downward, closed position as the chute pivots upwardly during operation. The discharge chute is thereby allowed to pivot as it abuts obstructions without causing the blades to be exposed, since the lid remains locked. The locking mechanism includes a pivot rod upon which the lid and chute are pivotally supported. The chute is biased to a downward position by a chute torsion spring that is received by the rod. The lid is biased to a closed position by a lid torsion spring that is also received by the rod. A bracket mounted with the mower deck supports the rod member. A cam member is fixed with the lid and includes a finger portion that abuts against a blocking member mounted with the deck. In the closed position the finger member is biased by the lid torsion spring into abutment with the blocking member. This interference between the finger member and the blocking member locks the lid in place and generally prevents the lid from pivoting from its closed position. When the operator wishes to open the lid, such as to mount the conduit or blower attachment to the deck, the operator must shift the lid laterally against the force applied by the lid torsion spring. Shifting the lid in this manner will shift the finger member out of abutment with the blocking member such that clearance is provided for the finger to shift past the blocking member. This allows the lid clearance to pivot to its open position. A slotted opening through which the rod is received allows the lid to pivot with respect to the rod as the operator shifts the lid laterally. The lid torsion spring biases the lid to swing toward its closed position, and also biases the cam member and finger member into locking engagement with the blocking member.

BRIEF DESCRIPTION OF THE DRAWINGS

FIG. 3 is a perspective view from the front left side of the locking mechanism, showing the discharge chute removed for clarity.

FIG. 4 is a perspective view from the rear left side of the locking mechanism, showing the discharge chute removed for clarity.

DETAILED DESCRIPTION OF THE PREFERRED EMBODIMENT

Figure 1:
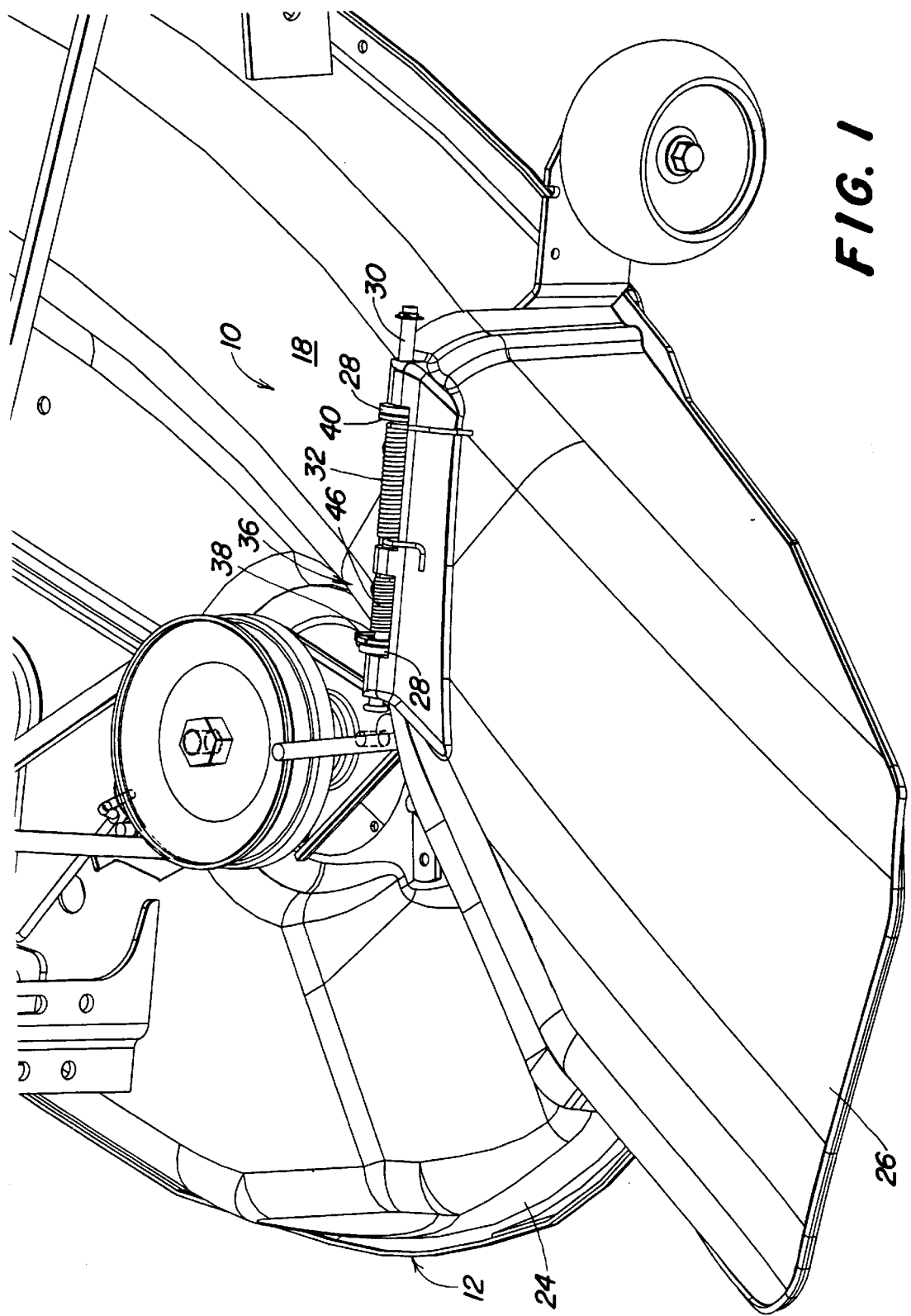
FIG. 1 is a perspective view of a mower deck and locking mechanism according to the preferred embodiment showing the discharge chute in its down position.
Figure 2:
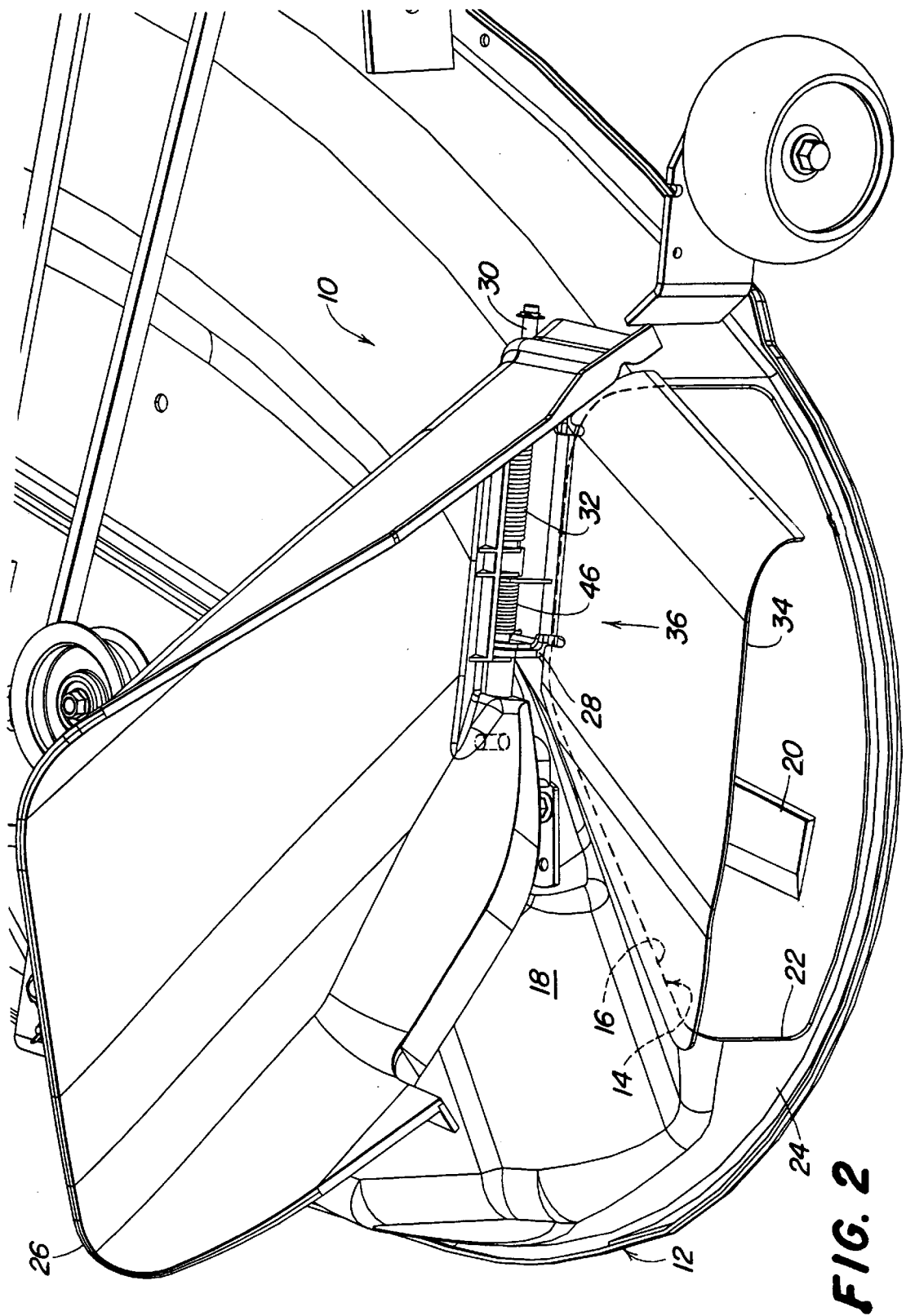
FIG. 2 is a perspective view of the mower deck and locking mechanism according to the preferred embodiment showing the discharge chute in a raised position such as when the chute abuts an obstruction during mowing operation. The lid is shown in FIG. 2 in its down, locked position, and portions of the opening in the mower deck are shown in phantom lines.

Referring now to FIGS. 1–4, there is shown the locking lid mechanism 10 according to the preferred embodiment of the present invention. A mower deck 12 is provided having a discharge opening 14 which is best seen in FIG. 2. The opening 14 includes a top portion 16 formed in the top wall 18 of the mower deck 12. The top portion 16 of the opening 14 is directly over the path of the blade 20 rotating within the mower deck 12. When a conduit or blower attachment (not shown) is mounted to the opening 14 in the mower deck 12, clippings are blown by the mower blade 20 upwardly through the top opening 16 and are then received by the conduit or blower for being directed to a rear bagging container. The opening 14 also includes a side portion 22 defined in the side wall 24 of the mower deck 12. When the mower 12 is in a side discharge mode, clippings are directed outwardly through the side portion 22 of the opening 14 for being deposited on the turf to the side of the mower 12. When the conduit or blower attachment is mounted to the mower deck 12, portions of the conduit or blower attachment generally cover or close this side portion 22 of the opening 14.

A discharge chute 26 is pivotally mounted to the mower deck 12. A U-shaped bracket 28 mounted to the mower deck 12 supports a pivot member or rod member 30 to which the discharge chute 26 is pivotally mounted. A chute torsion spring 32 is received by the rod member 30 and engages the bracket 28 and discharge chute 26 for biasing the discharge chute 26 to a downward position in direction of arrow A.

A lid 34 is also provided, as best seen in FIG. 2, for covering the top portion 16 of the discharge opening 14 when the mower 12 is operating in the side discharge mode. The lid 34 is pivotally mounted to the mower deck 12 by way of a hinge mechanism or locking device 36. Upstanding members 38 and 40 formed integral with the lid 34 define pivot openings 42 and 44 that receive the rod 30. A lid torsion spring 46 is received by the rod 30 and engages the lid 34 and the bracket 28 for biasing the lid 34 in the direction of arrow A to its downward closed position covering the top portion 16 of the opening 14. One of the upstanding members 38 defines a cam member 48 and finger portion 50 which is adapted for engagement with a blocking member 52 mounted with the bracket 28. The rod opening 42 in the cam member 48 defines an elongated slot 54. The slot 54 allows the cam 48 to be shifted in the direction of arrows B and C with respect to the stationary rod member 30, as will be described in more detail below.

Next, the operation of the present invention according to the preferred embodiment will be described in greater detail. During side discharge mowing operations, the chute torsion spring 32 biases the chute 26 to its downward position shown in FIG. 1. The lid torsion spring 46 biases the lid 34 to the position shown in FIG. 2 whereat the lid 34 generally covers and closes the top portion 16 of the opening 14. The lid torsion spring 46 biases the lid 34 to pivot about the rod 30 in the direction of arrow A shown in FIG. 3 to the closed position shown in FIG. 2. The lid torsion spring 46 also biases the lid 34 to shift generally linearly and laterally in the direction of arrow C shown in FIG. 3. This lateral shifting of the lid 34 causes the cam member 48 to shift in the direction of arrow C to its position shown in FIG. 3. In this position, the finger member 50 is in abutment with the blocking member 52. This interference between the finger member 50 and blocking member 52 serves to prevent or block the cam member 48 and lid 34 from pivoting upwardly to an open position. The lid torsion spring 46 biases the cam member 48 in the direction of arrow C such that the finger member 50 is biased into locking abutment with the blocking member 52.

When the operator wishes to mount a conduit or blower attachment above the opening 14 in the mower deck 12, the operator pivots the chute 26 upwardly to its raised position. The operator can then proceed to pivot the lid 34 to expose the top portion 16 of the opening 14 as follows. The operator first shifts the lid 34, cam member 48 and finger member 50 in the direction of arrow B against the force of the lid spring 46. Lateral shifting of the cam member 48 and finger member 50 in the direction of arrow B causes the finger member 50 to shift laterally clear of the blocking member 52. Once the finger member 50 is shifted laterally to a position clear of the blocking member 52, the finger member 50 has clearance to pivot downwardly alongside the blocking member 52. As the finger member 50 pivots downwardly in this manner, the lid 34 will pivot therewith to its open position as the finger member 50 pivots downwardly past the blocking member 52. Once the lid 34 is pivoted by the operator to its open position, the conduit or blower attachment can be mounted above the top portion 16 of the opening 14.

The slotted opening 54 in the cam member 48 provides clearance for the cam member 48 to shift with respect to the stationary rod member 30 in the directions of the B and C arrows. As the operator shifts the cam member 48 in the direction of arrow B, the lid 34 will actually pivot slightly about a vertical axis passing through the point of contact between the upstanding member 40 and the rod member 30. The opening 44 in the upstanding member 40 is slightly larger than the rod member 30 and therefore provides enough clearance for the upstanding member 40 to pivot slightly with respect to the rod member 30.

The lid torsion spring 46 serves dual biasing functions. The lid spring 46 biases the lid 34 to pivot about the rod 30 in the direction of arrow A to a closed position whereat the lid 34 covers the top portion 16 of the opening 14. The lid spring 46 also acts to bias and shift the lid 34 in the direction of arrow C such that the finger portion 50 is held in locking abutment with the blocking member 52. By serving a dual function, the lid spring 46 increases the simplicity of the design, reduces the number of parts required and correspondingly reduces the cost of the locking mechanism 36 according to the present invention.

The present invention therefore provides a mechanism for covering the top portion 16 of the opening 14 in the mower deck 12 when the deck 12 is converted from a bagging mode to a side discharge mode. The lid 34 is locked in its closed position during mowing operation and thereby generally prevents the opening 14 from being uncovered while mowing. To uncover the opening 14, the operator must carry out the additional step of actively shifting the lid 34 laterally before the lid 34 can be lifted to a position exposing the interior of the mower deck 12 and mower blade 20. The present invention also provides a side discharge chute 26 that is allowed to pivot as the chute 26 abuts obstruction, thereby reducing damage to the chute 26 and to the obstruction. The chute 26 is allowed to pivot in this manner without opening or exposing the interior of the mower deck 12, since the lid 34 remains locked in place as the chute 26 pivots. The mechanism according to the present invention is relatively simple in construction, comprised of relatively few parts, and is relatively inexpensive to manufacture.

The preferred embodiment provides a single opening 14 having top and side portions 16 and 22 formed in respective top and side walls 18 and 24 of the mower deck 12. However, two openings, one in the top wall 18 and the other in the side wall 24 of the deck 12 could also be provided within the spirit of the present invention.

I claim:

1. A mechanism, comprising:
   a mower deck within which at least one mower blade rotates for cutting grass, said mower deck defining an opening having a top portion defined in a top wall of the mower deck, said top portion being directly above the blade,
   a lid which covers the top portion of the opening, said lid having a locking mechanism which locks the lid in a position generally covering the top portion of the opening, said locking mechanism being releasable by an operator which special for shifting the lid to a position whereat the top portion of the opening is generally uncovered,
   a chute extending laterally outwardly from the opening, said chute serving to direct clippings laterally outwardly from said mower deck while the lid is positioned over the top portion of the opening, said chute being pivotable as the chute abuts obstructions during mowing operations, and the locking mechanism remains locked as the chute pivots.

2. The invention of claim 1, wherein said opening defines a side portion defined in a side wall of the mower deck, and grass clippings are directed through the side portion of the opening sidewardly out of the mower deck when the side portion is open, said chute being positioned to extend laterally outwardly from said side portion of the opening.

3. The invention of claim 1, wherein said chute is biased to a downward position.

4. The invention of claim 1, wherein said locking mechanism further comprises:
   a pivot member about which the lid is pivotable between open and closed positions,
   a biaser which biases the lid to pivot to the closed position and which biases the lid to shift laterally,
   a blocking member supported by the mower deck,
   a cam member fixed with the lid and having a finger portion which abuts the blocking member for blocking the cam member and lid from pivoting from the closed to the open position,
   said biaser also biases the cam member to a position whereat the finger portion abuts the blocking member for blocking the cam member and lid from pivoting to the open position,
   the lid being shiftable by the operator for shifting the finger portion clear of the blocking member for allowing the lid to be pivoted by the operator to its open position.

5. The invention of claim 4, wherein said opening also including a side portion defined by a side wall of the mower deck, and the chute extends laterally outwardly from the side portion of the opening for directing grass clippings downwardly as they exit the mower deck through the side portion of the opening.

6. The invention of claim 5, wherein said chute is pivotably supported by the pivot member for allowing the chute to pivot in response to abutment with obstructions during mowing operations.

7. The invention of claim 5, wherein said chute is pivotable in response to abutment with obstructions during mowing operations and is biased to a down portion.

8. The invention of claim 7, wherein said chute is biased to a down position by a torsion spring, said pivot member being positioned within said torsion spring.

9. The invention of claim 4, and further comprising a slot formed in the cam member and which receives the pivot member, said slot allows clearance for the cam member to be shifted by the operator relative to the pivot member and to a position whereat the finger is clear of the blocking member.

10. The invention of claim 4, wherein said pivot member is a rod member.

11. A mechanism comprising:
    a mower deck within which mower blades rotate for cutting grass and vegetation into clippings,
    a lid pivotally positioned for covering an opening in the mower deck,
    a pivot member about which the lid is pivotable between open and closed positions,
    a biaser which biases the lid to pivot to the closed position and which biases the lid to shift laterally,
    a blocking member supported by the mower deck,
    a cam member fixed with the lid and having a finger portion which abuts the blocking member for blocking the cam member and lid from pivoting from the closed to the open position,
    said biaser also biases the cam member to a position whereat the finger portion abuts the blocking member for blocking the cam member and lid from pivoting to the open position,
    the lid being shiftable by the operator for shifting the finger portion clear of the blocking member for allowing the lid to be pivoted by the operator to its open position.

12. The invention of claim 11, wherein said opening in the mower deck includes a top portion defined by a top wall of the mower deck, said top portion of the opening being positioned directly above the mower blade, said opening also including a side portion defined by a side wall of the mower deck, and said lid generally covers the top portion of the opening when in the closed position, and a chute extends laterally outwardly from the side portion of the opening for directing grass clippings downwardly as they exit the mower deck through the side portion of the opening.

13. The invention of claim 12, wherein said chute is pivotably supported by the pivot member for allowing the chute to pivot in response to abutment with obstructions during mowing operations.

14. The invention of claim 12, wherein said chute is pivotable in response to abutment with obstructions during mowing operations and is biased to a down portion.

15. The invention of claim 13, wherein said chute is biased to a down position by a torsion spring, said pivot member being positioned within said torsion spring.

16. The invention of claim 11, and further comprising a slot formed in the cam member and which receives the pivot member, said slot allows clearance for the cam member to be shifted by the operator to a position whereat the finger is clear of the blocking member.

17. The invention of claim 11, wherein said pivot member is a rod member.

18. The invention of claim 11, wherein said biaser is a torsion spring within which the pivot member is positioned.

19. The invention of claim 4, wherein said biaser is a torsion spring within which the pivot member is positioned.

20. The invention of claim 1, wherein said lid and chute pivot about a common axis.

21. The invention of claim 11, wherein said lid and chute pivot about a common axis.

* * * * *

UNITED STATES PATENT AND TRADEMARK OFFICE
CERTIFICATE OF CORRECTION

PATENT NO. : 5,913,804
DATED : June 22, 1999
INVENTOR(S) : Randy Edward Benway

It is certified that error appears in the above-indentified patent and that said Letters Patent is hereby corrected as shown below:

Column 5, line 36, delete "special for shifting" and insert "-- pivots --".

Signed and Sealed this

Twenty-fifth Day of April, 2000

Attest:

Q. TODD DICKINSON

Attesting Officer

Director of Patents and Trademarks